United States Patent [19]

Long et al.

[11] Patent Number: 4,788,115

[45] Date of Patent: Nov. 29, 1988

[54] PROCESSING HOLOGRAMS

[75] Inventors: William E. Long, Wilmslow; David W. Butcher, Goostrey, both of England

[73] Assignee: Ciba-Geigy AG, Basel, Switzerland

[21] Appl. No.: 940,047

[22] Filed: Dec. 10, 1986

[30] Foreign Application Priority Data

Dec. 11, 1985 [GB] United Kingdom ............... 8530454

[51] Int. Cl.$^4$ .................. G03H 1/04; G03C 5/00; G03C 5/04
[52] U.S. Cl. .......................... 430/2; 430/1; 430/394; 430/396; 430/945
[58] Field of Search ............... 430/1, 2, 394, 396, 430/945

[56] References Cited

U.S. PATENT DOCUMENTS

| | | | |
|---|---|---|---|
| 3,850,633 | 11/1974 | Moran et al. | 430/2 X |
| 4,032,348 | 6/1977 | Kido et al. | 430/461 X |
| 4,076,772 | 2/1978 | Murbach et al. | 430/2 X |
| 4,656,106 | 4/1987 | Holland et al. | 430/1 X |

FOREIGN PATENT DOCUMENTS 814288 6/1959 United Kingdom .

*Primary Examiner*—Mukund J. Shah
*Attorney, Agent, or Firm*—Wenderoth, Lind & Ponack

[57] ABSTRACT

Holograms which contain gelatin as the binder are prepared by holographically exposing the material by use of coherent light, developing the holographic image by a chemical or physical process and before processing, simultaneously or subsequently, treating the material with a solution of a gelatin reactive compound which has a molecular weight of over 200 and which reacts with the gelatin to form covalent bonds therewith to increase the molecular bulk of the gelatin.

13 Claims, No Drawings

PROCESSING HOLOGRAMS

The present invention relates to holograms and to their production.

In theory a hologram will replay using white light reconstruction, at about the wavelength of the coherent light which was used in the exposure to prepare it. However in practice, during the processing of holographic material there is usually some shrinkage of the gelatin binder and this causes, in general, the replay wavelength to be shorter than the wavelength of the laser used in the exposure of the material.

Nevertheless sometimes it is desired that the replay wavelength is longer than the wavelength of the laser used in exposing thee material. This is because lasers are expensive and it is desirable that the replay wavelength can be increased to produce a different colour replay hologram using only one laser. Further a He:Ne laser is fairly inexpensive and this emits at 633 nm. However, if it is required to copy holograms prepared using a He:Ne laser it is more efficient to do so using a pulsed ruby laser which emits at 694 nm. Thus it is desirable that a hologram which was made using a He:Ne laser can replay at 694 nm rather than at 633 nm or less.

In the past some attempt has been made to obtain this bathochromic shift in replay wavelength by treating the hologram with tanning developers such as pyrogallol or inorganic gelatin hardening agents such as aluminium salts, but the results have not beeen satisfactory. Further it has been found impossible to achieve a bathochromic shift to a desired replay wavelength in a reproducible manner.

Other attempts have been made using organic swelling agents such as triethanolamine, but the effect produced by such agents is not permanent, probably due to the volatility of such swelling agents.

We have found a method of preparing a hologram in which the binder is gelatin which exhibits a permanent and reproducible bathochromic shift in the replay wavelength.

Therefore according to the present invention there is provided a method of preparing a hologram which uses gelatin as the binder which method comprises holographically exposing the material by use of coherent light, developing the holographic image by a chemical or physical process and before processing, simultaneously or subsequently, treating the material with a solution of a compound which has molecular weight of over a 200 and which reacts with the gelatin to form covalent bonds therewith to increase the molecular bulk of the gelatin. A compound of this type is hereinafter referred to as a gelatin reactive compound. Preferably the solvent for the gelatin reactive compound is water.

A large number of compounds can be used in the process of the present invention, but particularly useful compounds are those compounds which are used to treat fibrous materials of animal origin such as wool and silk. Such compounds are used to treat wool and silk to increase their dye-ability and to render fabrics treated with them more crease resistant.

A useful group of such compounds comprises a residue of guanidine condensed with an aldehyde or with an amine.

These compounds have a very complex structure and can be best defined by their process of manufacture as set forth in British Patent Specification No. 814288 wherein it states that there is provided a process for the manufacture of condensation products, wherein a non-cyclic compound containing at least once the atomic grouping

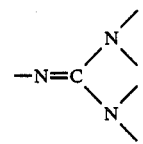

is condensed in a first state with an aldehyde and a salt of an aliphatic amine containing at least two primary or secondary amino groups at a temperature above 100° C., and the produce so obtained is further condensed in a second stage with an aldehyde and a water-soluble ammonium salt or amine salt in the presence of a solvent.

A particularly useful range of condensation compounds are obtained when the aldehyde used in the first stage condensation and in the second stage condensation is in each case formaldehyde.

Preferably the salt of an alphatic amine used is a salt of ethylene diamine. Also preferably the water-soluble ammonium salt used in the second stage condensation is ammonium chloride.

As non-cyclic compounds which contain at least once the grouping

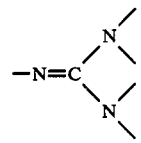

there may be used, guanidine, acetoguanidine, biguanide or substitution products of those compounds such as alkyl-biguanides or aryl-biguanides. Most preferably, however, the non-cyclic compound used is dicyandiamide.

An especially useful compound is obtained which is the reaction product of formaldehyde, ammonium chloride, dicyandiamide and ethylene diamine in a molar ratio of 2:1:1:0.1. This compound is hereinafter referred to as Condensate 1.

When a condensate of the type described in B. Pat. No. 814288 is used to treat the holographic material a greater effect is observed the higher the pH used. Also a greater effect is observed using an elevated temperature.

Similar compounds to those described in B. Pat. No. 814288 are polymers prepared by condensing formaldehyde, dicyandiamide and ammonium chloride. These compound differ from those of B. Pat. No. 814288 in that no ethylene diamine is present in the reaction mixture. Preferably, the molar ratio of formaldehyde:ammonium chloride:dicyadiamide is (1 to 5):(1 to 2):(1 to 2). A number of such condensation compounds are prepared in which the molar ratio of dicyandiamide to ammonium chloride was held constant at 1:1 molar but the relative number of mole of formaldehyde was varied over the range of 1.8 to 2.2. It was seen as shown in Example III which follows, that the greater the molar proportion of formaldehyde the greater the bathchromic shift when these compounds were used in the process of the present invention.

A commerically available compound which is of use in the present invention is sold by Allied Colloids under the Trade name of Alcofix R as a dye fixing agent for use in treating ceelulosic fibres. The results of using Alcofix R are shown in Example IV which follows.

Another group of useful compounds are compounds of the general formula

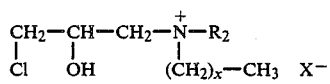

where R is a lower alkyl group, x is from 10 to 18 and X is an anion. Compounds of this type are manufactured by Degussa under the Trade Name of QUAB. They react with gelatin more readily at a high pH when an epoxide group is formed. A compound of the above general formula wherein x was 0 and thus had a molecular weight of below 200 was not of use in the present invention. The use of these compounds is illustrated in Example V which follows.

By lower alkyl group is meant an alkyl group with up to four carbon atoms. However, most preferably R is a methyl group.

Another useful class of compounds are the so-called reactive dyestuffs which comprise at least one hydrophilic group and at least one group which can react with a textile such as wool, cotton or silk.

Reactive dyestuffs were developed to dye cottons and rayons; other have been developed to dye wool and silk. It would be though that as gelatin has a greater similarity with wool or silk than cellulose the reactive dyestuffs which can be used primarily for wool or silk only could be used in the method of the present invention. However, it has been found that a number of reactive dyestuffs which are used for cellulose can also be used in the method of the present invention.

Reactive dyes comprise a chromophore group and a reactive group.

Examples of reactive groups are substituted monoazine,diazine-,triazine-,oxazine-,pyridine-,pyrimidine-,pyridazine-,pyrazine-and thiazine-rings and rings of this type which are annelated for example, phthalazine, quinoline, quinazoline, quinoxaline and acridine rings.

Other examples of reactive groups are acryloyl and mono-,di-or trichloroacryloyl for example —CO CH=CH Cl and other substituted acryloyl groups such as -methylsulphonylacryloyl and protected arcyloyl groups. Also vinyl sulphone groups and protected vinyl sulphone groups.

A long list of reactive groups is given in European patent application No. 134033.

Examples of reactive groups which have been used in commercial reactive dyes are:

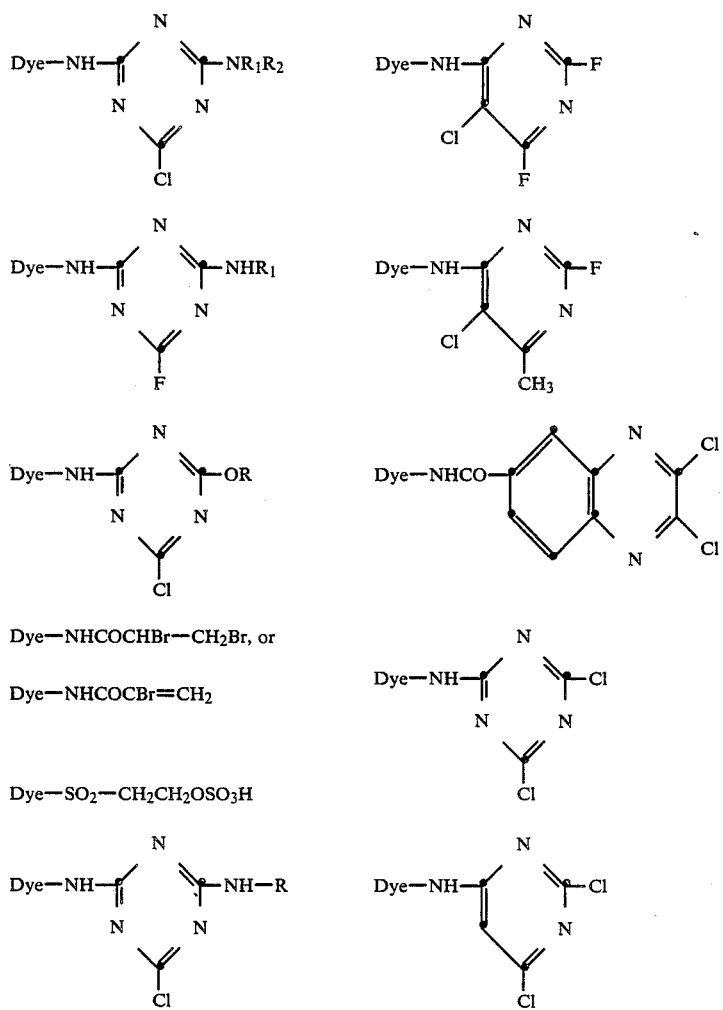

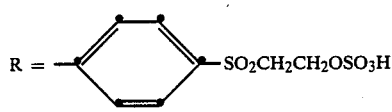

In most cases the 'DYE' moiety contains a water-solubilising group.

The nature of the dye chromophore is not important in the method of the present invention, but chromophores present include azo, anthroquinone and phthalocyanine groups. However, it is preferred that the colour of the dyes are green, orange or yellow as dyes of these colours absorb less light at the replay wavelength than do bluish dyes.

When the holographic material is of the silver halide in a gelatin binder type the usual processing sequence is silver halide development using a silver halide developing agent for example hydroquinone, followed by a silver bleaching process.

The silver bleaching step may be any process of removing the developed silver, but which leaves the unexposed silver halide in situ. It is to be understood that the developed silver may be converted to silver halide some of which may remain in the holographic material.

Examples of bleaching techniques are solvent bleaching methods in which the developed silver is removed from the material and rehalogenating bleaching methods, in which the developed silver is converted to silver halide.

After the holographic exposure the material may be treated with an aqueous solution of the gelatin reactive compound before development or the gelatin reactive compount may be present in the silver halide developing solution or in a stop bath between silver halide development and bleaching or in the bleach bath or in a bath in which the material is treated after bleaching.

The bathochromic shift observed does not seem to be greatly affected by the position in the processing sequence in which the material is treated with an aqueous bath of the gelatin reactive compound. However it is often convenient to treat the material with an aqueous bath of the gelatin reactive agent after the bleach bath.

If the material is washed subsequent to the gelatin reactive compound treatment bath often some initial lessening in the bathochromic shift effect is observed, but this lessening does not increase substantially if the material is washed for a longer time.

The bathochromic shift was found to be independent of the duration of holographic exposure. This is unlike the effect observed when using a tanning developer such as pyrogallol to achieve a bathochromic shift.

A useful concentration of a condensation product to use in the present invention is a 3–10% by weight aqueous solution and of the reactive dye 0.5–2.5% by weight aqueous solution.

The following examples will serve to illustrate the invention.

EXAMPLE 1

Samples of holographic material were prepared by coating onto a transparent photographic film base a gelatino silver halide emulsion which was substantially pure silver bromide having a mean crystal size of 0.03 microns at a silver coating weight of 30 mg/dm$^2$. The emulsion was optically sensitised with a red sensitising dye so that it was optimally sensitive to 633 n.m. the colour of a He:Ne laser.

The material was holographically exposed by a Denisyuk exposure method using a brushed aluminium plate as an object to yield (after processing) a reflective hologram.

The material was then developed for 2 minutes in a solution of the following formulation:

Sodium Sulphite Anhydrous: 30 g
Hydroquinone: 10 g
Sodium Carbonate: 60 g
Water to 1000 ml The samples were then transferred to rehalogenating bleach bath of the following composition:

Fe(NH$_4$)EDTA(1.8M Solution): 150 ml
KBr: 20 g
Water to 1000ml until all silver metal had been bleached out which was about 2 minutes.

The samples were then water washed in running water for 1 minute and transferred to an aqueous bath which consisted of 10% by weight solution of condensate 1 for 5 minutes. The pH and temperature of this solution was as set forth in Table 1.

TABLE 1

| Aqueous Solution | pH | Temp °C. | Exposure (Seconds) | Replay λ (nm) | Final Water Wash (mins) | Batho-chromic shift λ (nm) |
|---|---|---|---|---|---|---|
| Control | — | 20 | 0.25 | 573.2 | — | — |
| Control | — | 20 | 1.00 | 574.2 | — | — |
| Condensate 1 | 4.5 | 40 | 0.25 | 637.9 | 0 | 64.7 |
| Condensate 1 | 4.5 | 40 | 1.00 | 636.2 | 0 | 62.0 |
| Condensate 1 | 11.0 | 20 | 1.00 | 836.6 | 0 | 248.1 |
| Condensate 1 | 11.0 | 20 | 1.00 | 764.9 | 0.5 | 176.4 |
| Condensate 1 | 11.0 | 20 | 1.00 | 746.9 | 1.0 | 158.4 |
| Condensate 1 | 11.0 | 20 | 1.00 | 730.4 | 5.0 | 141.9 |
| Condensate 1 | 11.0 | 20 | 1.00 | 719.9 | 10.0 | 131.4 |

In another test the results were as follows:

TABLE 2

| Aqueous Solution | pH | Temp °C. | Exposure (Seconds) | Replay λ (nm) | Final Water Wash (mins) | Batho-chromic shift λ (nm) |
|---|---|---|---|---|---|---|
| Condensate 1 | 11.0 | 40 | 0.5 | >860 | 0 | >269 |

TABLE 2-continued

| Aqueous Solution | pH | Temp °C. | Exposure (Seconds) | Replay λ (nm) | Final Water Wash (mins) | Batho-chromic shift λ (nm) |
|---|---|---|---|---|---|---|
| Condensate 1 | 11.0 | 40 | 0.5 | 765 | 1.0 | 174 |
| Condensate 1 | 11.0 | 40 | 0.5 | 742 | 10.0 | 151 |
| Control | | | 0.5 | 591 | | |

In these tests the energy value of the exposures are as follows:

0.25 seconds corresponds to 375 μJ.
0.5 seconds corresponds to 750 μJ.
1.0 seconds corresponds to 1500 μJ.

In further tests condensate 1 was added before and during processing.

In test A the holographically exposed material was treated in a 10% by weight aqueous solution of condensate 1 before development.

In test B 50 g of condensate 1 was added to 1 liter of developing solution.

In test C 50 g of condensate 1 was added to 1 liter of the rehalogenating bleach bath.

The results were as follows:

TABLE 3

| | Temp °C. | Exposure Seconds | Replay λ (nm) | Waterwash | Shift λ (nm) |
|---|---|---|---|---|---|
| Control | | 0.5 | 590 | | |
| Test A | 20° C. | 0.5 | 654 | 0 | 64 |
| Test B | 30° C. | 0.5 | 619 | 0 | 29 |
| Test C | 30° C. | 0.5 | 630 | 0 | 40 |

The replay wavelength was determined by plotting the diffuse reflectance against wavelength and calculating the wavelength of maxiumum response.

EXAMPLE II

Strips of holographic material were prepared as in Example I. They were exposed and processed as in Example I except that after the bleaching step they were treated in an aqueous bath which comprised a 1% by weight solution of a reactive dyestuff.

The following dyestuffs were used:

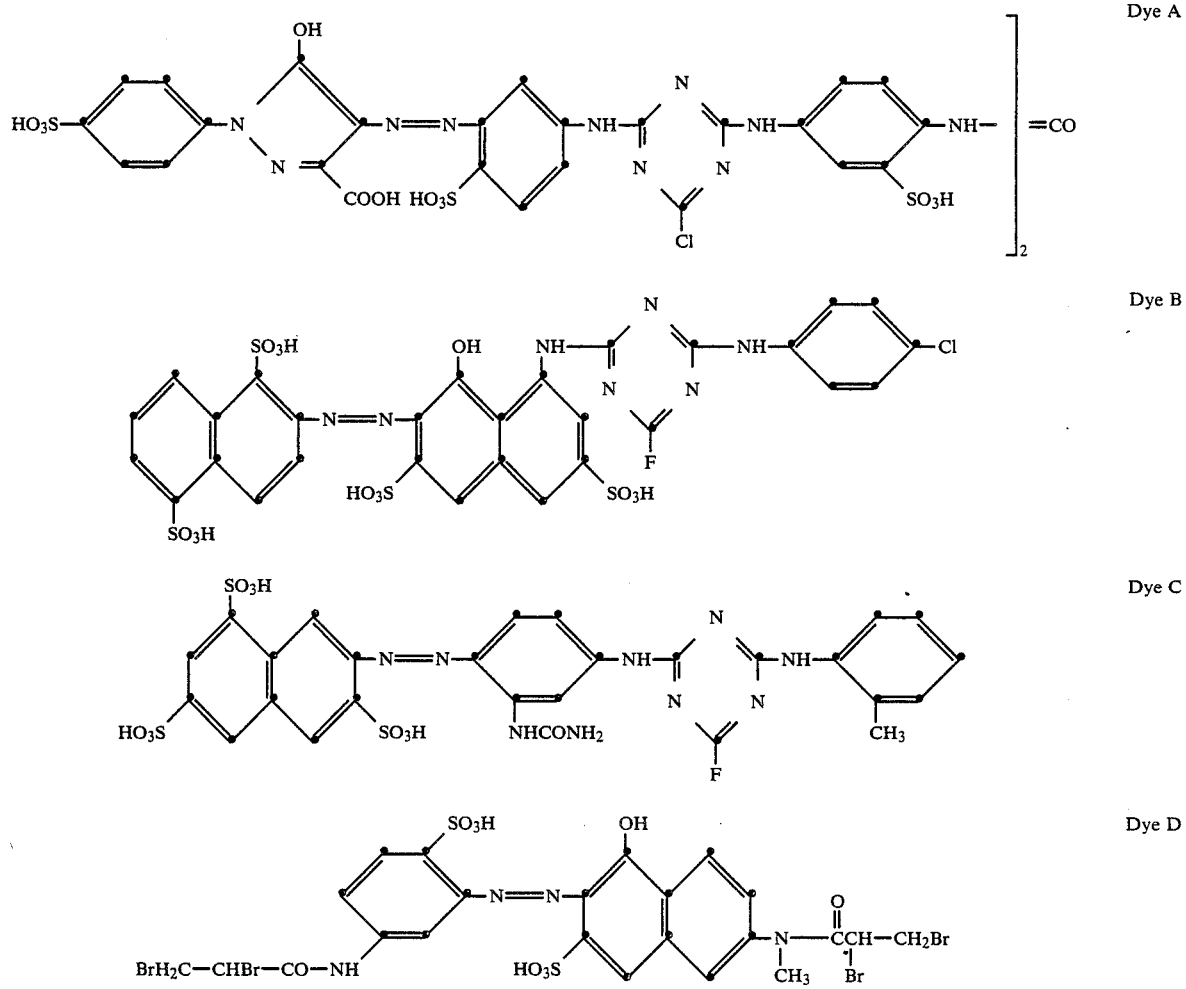

Dye A

Dye B

Dye C

Dye D

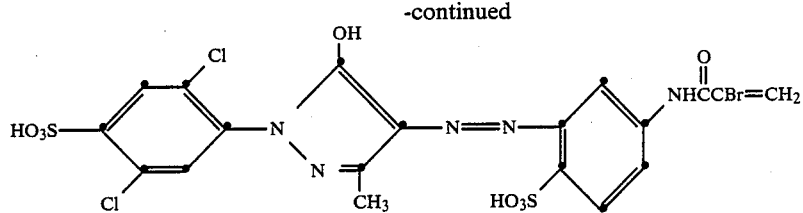

Dye E

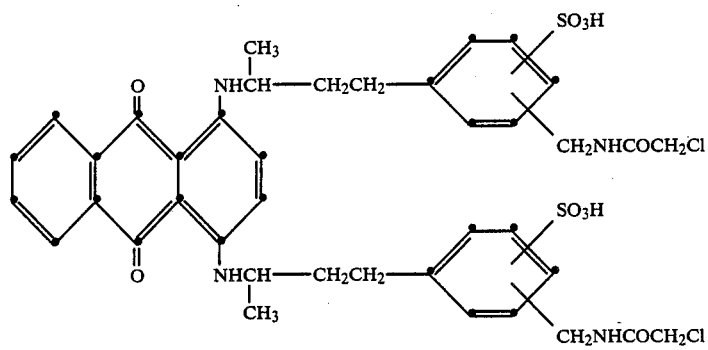

Dye F

TABLE 4
Test 1

| Dye | Temp (°C.) | pH | Treatment (mins) | Replay (nm) | Batho-chromic shift (nm) |
|---|---|---|---|---|---|
| Control | | | | 573 | |
| Dye A | 27 | 5.5 | 5 | 597 | 24 |
| Dye A | 40 | 5.5 | 5 | 597 | 24 |
| Dye A | 43 | 10.0 | 2 | 598 | 25 |

Same dye, different temperature and pH.

TABLE 5
Test 2

| Dye | Temp (°C.) | pH | Treatment Time (mins) | Replay (nm) | Batho-chromic Shift (nm) |
|---|---|---|---|---|---|
| Control | | | | 588 | |
| Dye B | 40 | 4.5 | 5 | 604 | 16 |
| Dye C | 40 | 4.5 | 5 | 600 | 12 |
| Dye D | 40 | 4.5 | 5 | 637 | 49 |
| Dye E | 40 | 4.5 | 5 | 598 | 10 |
| Dye F | 40 | 4.5 | 5 | 672 | 84 |

Different dyes, same temperature and pH.

TABLE 6
After Bleaching Step:
Dye D, 2.5% aqueous solution at pH 4.5 and 20° C.

| Sample | Exposure | Replay λ (nm) | Batho-chromic Shift λ (nm) |
|---|---|---|---|
| Dye D | 0.25 | 649 | 59 |
| | 0.5 | 647 | 57 |
| | 1.0 | 647 | 57 |

This shows that the exposure time does not affect the bathochromic shift.

EXAMPLE III

Polymers were prepared from formaldehyde, dicyandianide and ammonium chloride. The molar ratio of dicyandianide to NH4Cl was held constant at 1:1 (molar) and the relative number of moles of formaldehyde varied over the range 1.8 to 2.2.

In a typical reaction (2:1:1) formaldehyde solution (37%), 38.59 g dicyandiamide (20.00 g) and ammonium chloride (12.74 g) were dissolved in 22.71 g water and stirred under nitrogen at 90° C. for 5 hours. The reaction mixture was cooled to room temperature, precipitated into acetone, the white powdery or flaky product washed with acetone and dried. The following products were obtained:

| Polymer | Ratio | | | Viscosity of reaction mixture in cps. |
|---|---|---|---|---|
| | CH2O | dicyandiamide | NH4Cl | |
| 1 | 1.8 | 1 | 1 | 10 |
| 2 | 1.9 | 1 | 1 | 10 |
| 3 | 2.0 | 1 | 1 | 12 |
| 4 | 2.1 | 1 | 1 | 14 |
| 5 | 2.2 | 1 | 1 | 19 |

Samples of holographic material were prepared and processed as in Example 1 up to and including the rehalogenating bleach bath step.

Samples of this holographic material were then immersed in 2% aqueous solutions of each of Polymers 1 to 5 at pH9 at 40° C. The results are shown in Table 1.

TABLE 7

| Polymer | Soak time minutes | | | |
|---|---|---|---|---|
| | 1 | 5 | 10 | |
| Control | (580) | (580) | (580) | |
| 1 | 634 | 638 | 639 | Replay wavelengths in nm |
| 2 | 638 | 640 | 645 | |
| 3 | 638 | 650 | 667 | |
| 4 | 639 | 649 | 669 | |
| 5 | 647 | 670 | 698 | |

EXAMPLE IV

Samples of holographic material were prepared and processed as in Example I up to and including the rehalogenating bleach bath step.

A sample of this material was then immersed in 2% aqueous solutions of Alcofix R at different pH's for 5 minutes at 40° C. The results are set out in Table 8.

TABLE 8

| | pH of Alcofix R Solutions | Replay wavelength (nm) |
|---|---|---|
| Control | | 580 |
| Alcofix R | 6.4 | 633 |
| Alcofix R | 11.8 | 667 |
| Alcofix R | 14.0 | 697 |

EXAMPLE V

The action of the following QUAB compounds were tested. QUAB 188 molecular weight 188, as formula hereinbefore set forth with three ($CH_3$) on the quanternary nitrogen atom QUAB 342, molecular weight 342, as formula hereinbefore indicated with two ($CH_3$) groups and one $(CH_2)_{11}$ $CH_3$ group attached to the quanternary nitrogen atom. QUAB 360, average molecular weight 360. This is a mixture of compounds of the formula hereinbefore set forth with two ($CH_3$) groups on the quanternary nitrogen atom the third alkyl group ranging from C-11 to C-19.

Samples of holographic material were prepared and processed as in Example 1 up to and including the rehalogenating bleach bath step.

Samples of this holographic material were immersed in 2% aqueous solutions of the QUAB pH as set forth in Table 9. The results show the replay wavelength in nm.

TABLE 9

| | pH 11 Treatment Time minutes | | pH 14 Treatment Time minutes | |
|---|---|---|---|---|
| | 2 | 10 | 2 | 10 |
| QUAB188 | 570 | | 570 | |
| QUAB188 | | 570 | | 570 |
| QUAB342 | 650 | | 690 | |
| QUAB342 | | 650 | | 690 |
| QUAB360 | 700 | | 700 | |
| QUAB360 | | 725 | | 860 |
| CONTROL | | 570 | | 570 |

These results show that QUAB 188 which has a molecular weight of only 188 is not a useful compound for the process of the present invention. The QUAB compounds show a much greater effect at the higher pH.

What is claimed is:

1. A method of preparing a hologram which uses gelatin as the binder which method comprises holographically exposing the material by use of coherent light, developing the holographic image by a chemical or physical process and before processing, simultaneously or subsequently, treating the material with a solution of a gelatin reactive compound which has a molecular weight of over 200 and which reacts with the gelatin to form covalent bond therewith to increase the molecular bulk of the gelatin, the increase in the molecular bulk of the gelatin achieving a bathochromic shift in the replay wavelength of the hologram in the range of from 10 to 248.1 nm.

2. A method of preparing a hologram according to claim 1 wherein the gelatin reactive compound comprises a residue of guanidine condensed with an aldehyde and/or at least one amine.

3. A method of preparing a hologram according to claim 2 wherein the gelatin reactive compound is a condensation compound formed by condensing a noncyclic compound containing at least once the atomic grouping.

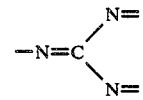

in a first stage, with an aldehyde and a salt of an aliphatic amine containng at least two primary or secondary amino groups at a temperature above 100° C., and the product so obtained is further condensed in a second stage with an aldehyde and a water-soluble ammonium salt or amine salt in the presence of a solvent.

4. A method according to claim 3 wherein the aldehyde used in the first stage condensation and in the second stage condensation is in each case formaldehyde.

5. A method according to claim 3 wherein the salt of the aliphatic amine used is a salt of ethylene diamine.

6. A method according to claim 3, wherein the water-soluble ammonium salt used in the second stage condensation is ammonium chloride.

7. A method according to claim 3 wherein the condensation compound used is the rection product of formaldehyde, ammonium chloride, dicyandiamide and ethylene diamine in a molar ratio of 2:1:1:0.1.

8. A method according to claim 2 wherein the gelatin reactive compound is a condensation product of formaldehyde, ammonium chloride and dicyandiamide in a molar ratio of 1 to 5:1 to 2:1 to 2.

9. A method according to claim 2 wherein the gelatin reactive product is a condensation product of diacyandamide and diethylene-triamine.

10. A method according to claim 1 wherein the gelatin reactive compound is a compound of the general formula:

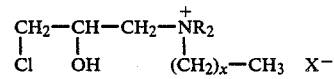

where R is an alkyl group having 1 to 4 carbon atoms x is from 10 to 18 and $X^-$ is an anion.

11. A method according to claim 1 wherein the gelatin reactive product is a reactive dyestuff.

12. A method according to claim 7 wherein the reactive group in the reactive dyestuff is a substituted monoazine-,diazine-,triazine-,pyrimidine-, acryloyl- or vinyl sulphone- group.

13. A hologram which has been prepared by the method according to claim 1.

* * * * *